US012297678B1

(12) United States Patent
Wade

(10) Patent No.: US 12,297,678 B1
(45) Date of Patent: May 13, 2025

(54) DEVICE TO SLOW OR STOP A DOOR FROM OPENING

(71) Applicant: Erik Kelsey Wade, Anaheim, CA (US)

(72) Inventor: Erik Kelsey Wade, Anaheim, CA (US)

( * ) Notice: Subject to any disclaimer, the term of this patent is extended or adjusted under 35 U.S.C. 154(b) by 103 days.

(21) Appl. No.: 18/218,146

(22) Filed: Jul. 5, 2023

(51) Int. Cl.
*E05C 17/44* (2006.01)
*E05C 17/04* (2006.01)
*E05C 17/54* (2006.01)
*E05C 19/00* (2006.01)
*E05C 19/18* (2006.01)

(52) U.S. Cl.
CPC ............ *E05C 17/443* (2013.01); *E05C 17/44* (2013.01); *E05C 17/045* (2013.01); *E05C 17/54* (2013.01); *E05C 19/004* (2013.01); *E05C 19/188* (2013.01)

(58) Field of Classification Search
CPC ........ E05C 17/443; E05C 17/54; E05C 17/56; E05C 17/045; E05C 17/44; E05C 17/52; E05C 17/446; E05C 17/047; E05C 17/50; E05C 19/004; E05C 19/188; E05C 19/003; E05D 11/00; Y10T 292/65; Y10T 292/67; Y10T 292/0848
See application file for complete search history.

(56) References Cited

U.S. PATENT DOCUMENTS 1,108,731 A * 8/1914 Ford ..................... E05C 17/443 292/338
1,179,201 A * 4/1916 Lynch ................... E05C 17/443 292/338
1,584,637 A * 5/1926 Neuviller .............. E05C 17/443 292/338
1,698,944 A * 1/1929 De Foe ................. E05C 17/443 292/238
1,704,967 A * 3/1929 Fuller ................... E05C 17/443 292/238
1,800,086 A * 4/1931 Larson .................. E05C 17/443 292/338
1,879,119 A * 9/1932 Dauble ................. E05C 17/443 292/338
2,798,755 A * 7/1957 Zapotocny .............. E05C 17/54 16/86 A (Continued)

FOREIGN PATENT DOCUMENTS

JP 2000160909 A * 6/2000
KR 20090012896 U * 12/2009 ............ E05C 17/44

(Continued)

*Primary Examiner* — Christine M Mills
*Assistant Examiner* — Faria F Ahmad
(74) *Attorney, Agent, or Firm* — Plager Schack LLP; Mark H. Plager; Kara Verryt

(57) ABSTRACT

A device for slowing or stopping a door from opening or moving may include a base designed to be attached to the door, the base including a magnet mounted thereto; and a spring loaded blade hingeably attached to a bottom portion of the base, the spring loaded blade having a proximal flat end and a distal pointed end, wherein the blade is configured to pivot from a first closed orientation to a second deployed configuration. When the blade is in the first closed orientation the blade is engaged with the magnet on the base, and when the blade is in the second deployed configuration, the blade is disengaged from the magnet and the distal pointed end is pointing at an angle downward from the base.

4 Claims, 4 Drawing Sheets

(56) References Cited

U.S. PATENT DOCUMENTS

| | | | | | |
|---|---|---|---|---|---|
| 2,964,780 | A * | 12/1960 | Blankenship | E05C 17/443 | 16/82 |
| 3,006,676 | A * | 10/1961 | Germock, Jr. | E05C 17/443 | 16/86 A |
| 3,141,188 | A * | 7/1964 | Gray | E05C 17/443 | 16/83 |
| 3,737,186 | A * | 6/1973 | Chezem | E05C 17/443 | 292/338 |
| 3,809,419 | A | 5/1974 | Chezem | | |
| 4,163,574 | A * | 8/1979 | Chezem | E05C 19/004 | 292/338 |
| 4,673,203 | A * | 6/1987 | Chezem | E05C 17/443 | 292/338 |
| 4,967,453 | A * | 11/1990 | MacDonald | B42F 1/02 | 150/137 |
| 5,098,138 | A * | 3/1992 | Vandewege | E05C 19/004 | 292/338 |
| 5,248,174 | A * | 9/1993 | Matz | E05B 65/0852 | 292/DIG. 47 |
| 5,673,952 | A * | 10/1997 | Chezem | E05C 17/443 | 292/338 |
| 5,771,533 | A * | 6/1998 | Kuang-Pin | E05C 17/443 | 16/82 |
| 6,120,072 | A * | 9/2000 | Benedict | E05C 17/443 | 292/338 |
| 6,584,642 | B2 * | 7/2003 | Hodson | E05F 5/08 | 16/86 B |
| 9,470,032 | B2 * | 10/2016 | Swanberg | E05F 5/06 | |
| 11,898,386 | B1 * | 2/2024 | Mitchell | E05C 17/045 | |
| 11,993,956 | B2 * | 5/2024 | Hamand | E05C 3/048 | |
| 2004/0181902 | A1 * | 9/2004 | Pierce | E05C 17/443 | 16/49 |
| 2010/0319160 | A1 * | 12/2010 | Rooney | E05C 17/443 | 16/82 |
| 2012/0080891 | A1 * | 4/2012 | Bravo | E05C 17/443 | 292/251.5 |
| 2014/0001775 | A1 * | 1/2014 | Mullenbach | E05C 17/443 | 292/288 |
| 2019/0085605 | A1 * | 3/2019 | Adams | E05C 17/44 | |

FOREIGN PATENT DOCUMENTS

| | | | | | |
|---|---|---|---|---|---|
| KR | 200451923 | Y1 * | 1/2011 | E05C 17/44 | |
| KR | 101075833 | B1 * | 10/2011 | E05C 17/44 | |
| KR | 200461731 | Y1 * | 8/2012 | E05C 17/44 | |
| KR | 101305999 | B1 * | 9/2013 | E05B 47/0001 | |
| KR | 101440435 | B1 * | 9/2014 | E05C 17/44 | |

* cited by examiner

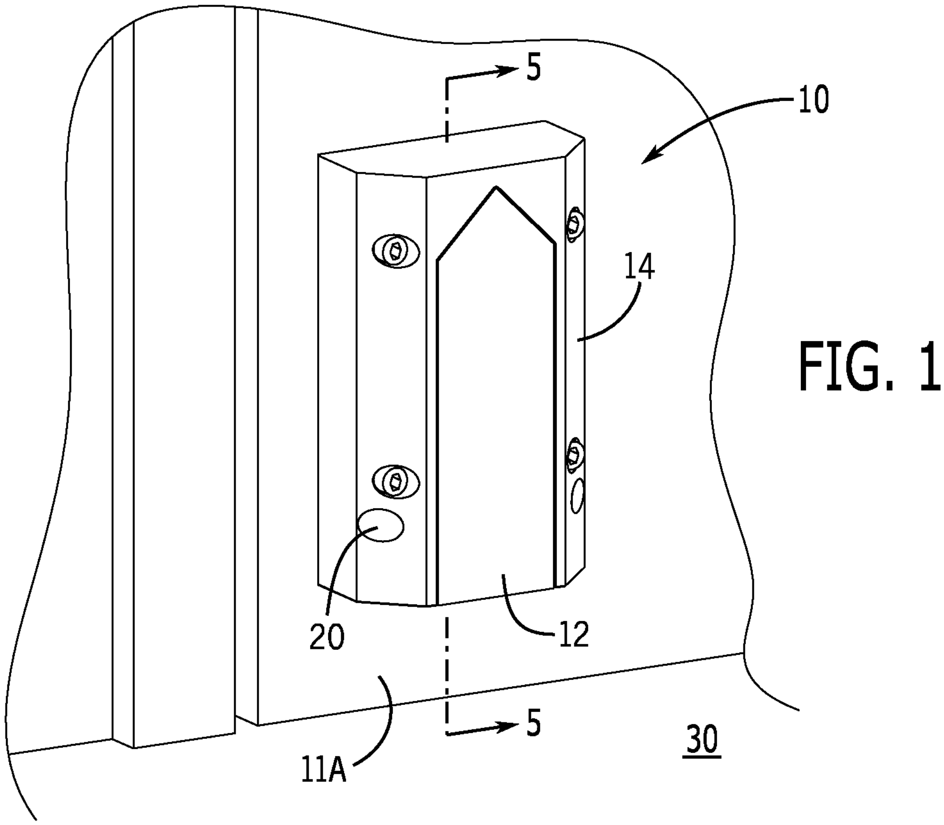
FIG. 1
FIG. 2
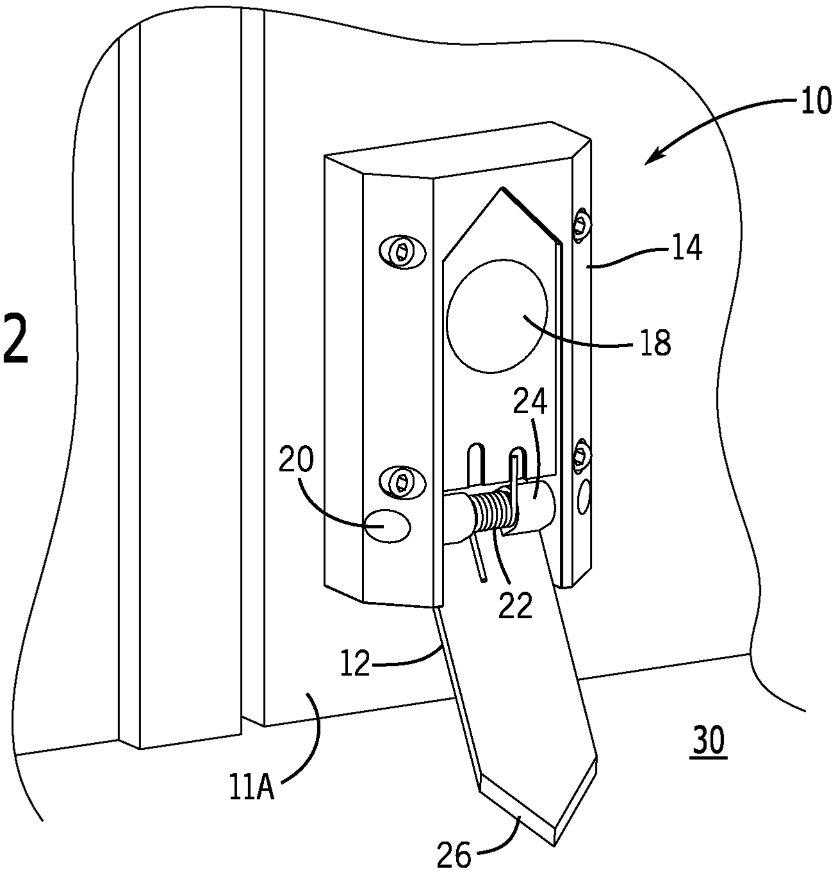

DEVICE TO SLOW OR STOP A DOOR FROM OPENING

BACKGROUND

The embodiments described herein relate generally to security device and, more particularly, to a device for slowing or stopping a door from opening.

There are many instances where a door needs to be quickly and easily secured to prevent or slow it from opening. This is particularly desired in lockdown situations or active shooter situations, such as those that happen at schools, hospitals, business offices, and the like. Unfortunately, door locks themselves are not always sufficient, as an intruder can damage a lock by shooting it or by simply shoving the door with enough force.

While there are existing devices that are aimed at preventing or stopping a door from opening, many of those are difficult to deploy, particularly for small children or individuals with mobility issues. Others of the existing devices are simply ineffective or cost prohibitive.

Therefore, what is needed is a simple, yet effective device that is easily attached to a door and quickly and easily deployed, even by children, to prevent or slow a door from opening.

SUMMARY

Some embodiments of the present disclosure include a device for slowing or stopping a door from opening or moving. The device may include a base designed to be attached to the door, the base including a magnet mounted thereto; and a spring loaded blade hingeably attached to a bottom portion of the base, the spring loaded blade having a proximal flat end and a distal pointed end, wherein the blade is configured to pivot from a first closed orientation to a second deployed configuration. When the blade is in the first closed orientation the blade is engaged with the magnet on the base, and when the blade is in the second deployed configuration, the blade is disengaged from the magnet and the distal pointed end is pointing at an angle downward from the base.

BRIEF DESCRIPTION OF THE FIGURES

The detailed description of some embodiments of the invention is made below with reference to the accompanying figures, wherein like numerals represent corresponding parts of the figures.

FIG. 1 is a front perspective view of one embodiment of the present disclosure, shown in a closed configuration.

FIG. 2 is a front perspective view of one embodiment of the present disclosure, shown in an open configuration.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

The device of the present disclosure may be used as a device to stop or slow a door from opening or moving and may comprise the following elements. This list of possible constituent elements is intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device.

The various elements of the present disclosure may be related in the following exemplary fashion. It is not intended to limit the scope or nature of the relationships between the various elements, and the following examples are presented as illustrative examples only.

Figure 3:
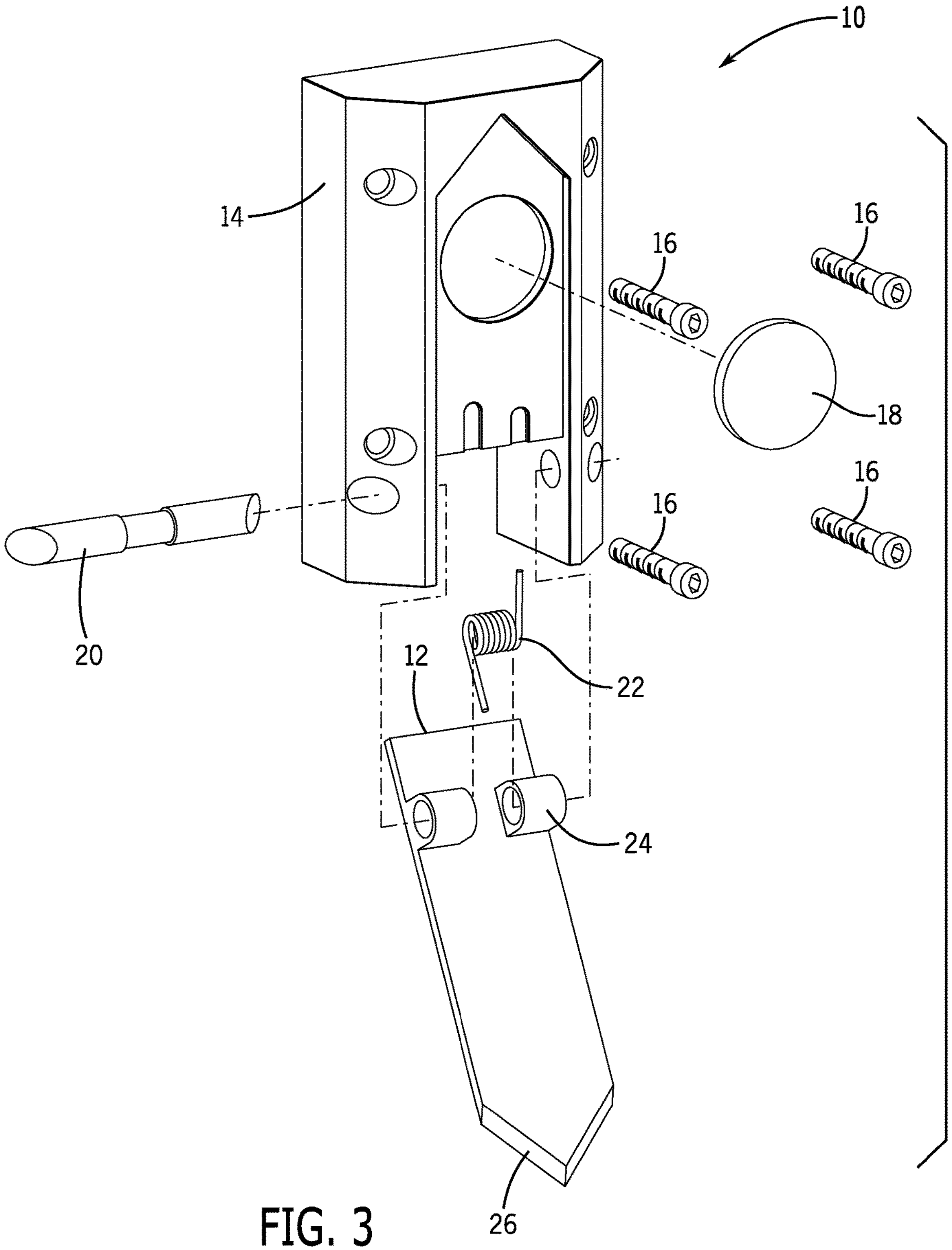
FIG. 3 is an exploded perspective view of one embodiment of the present disclosure.
Figure 4:
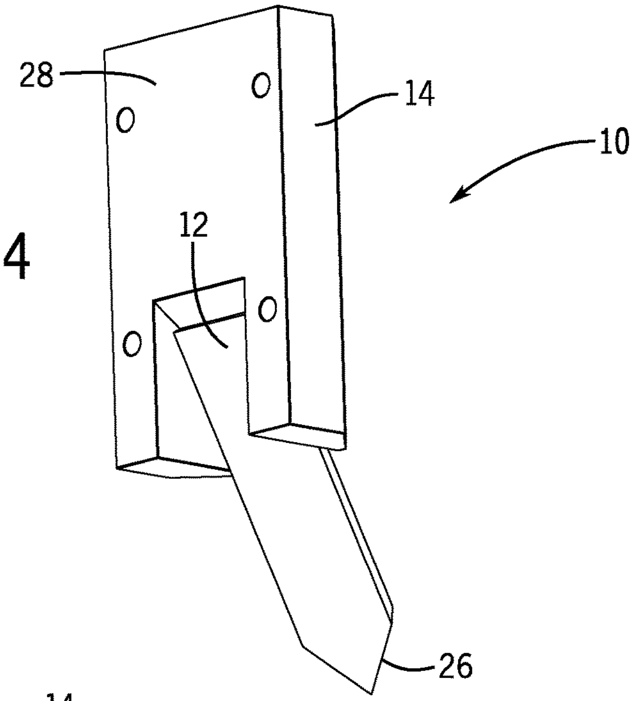
FIG. 4 is a bottom perspective view of one embodiment of the present disclosure.
Figure 5:
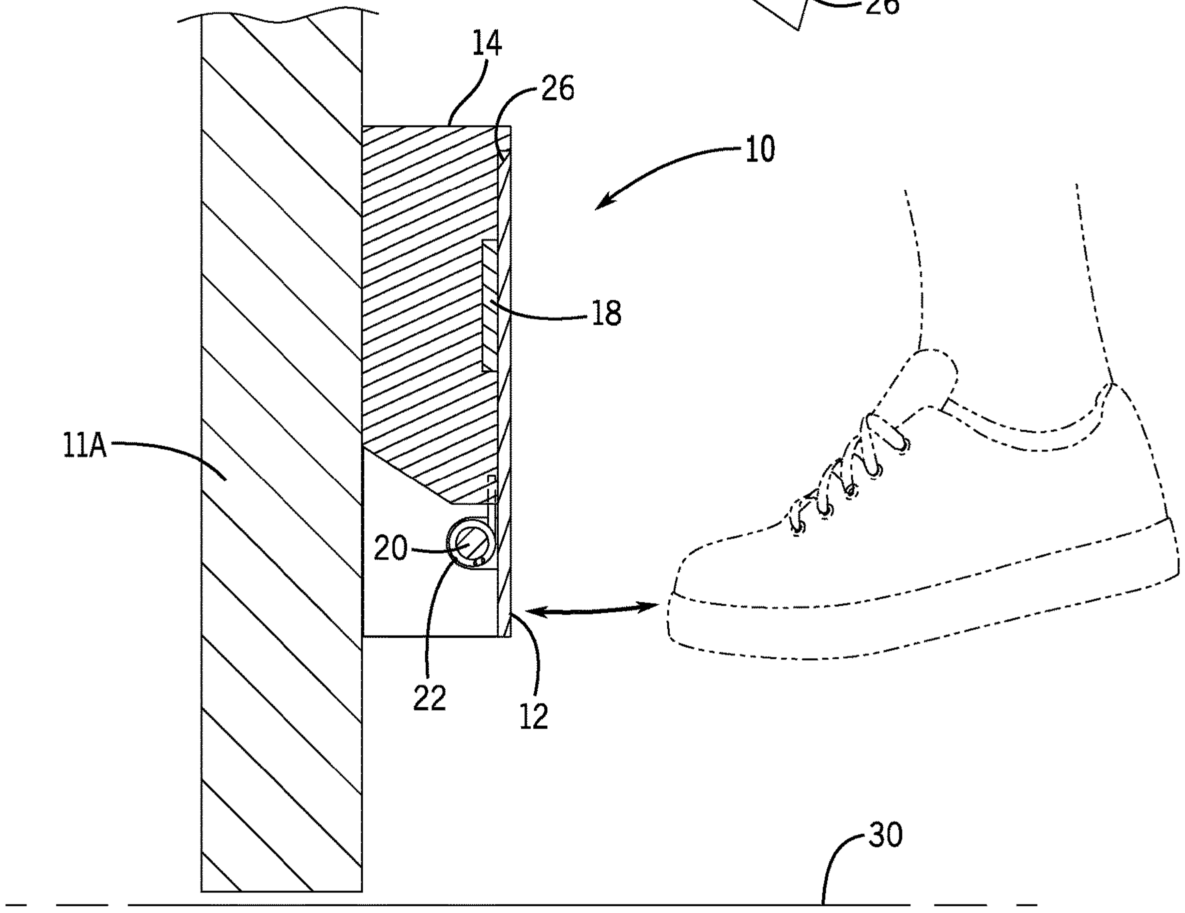
FIG. 5 is a cross-sectional view of one embodiment of the present disclosure, taken along line 5-5 of FIG. 1, showing a motion to activate the blade component.
Figure 6:
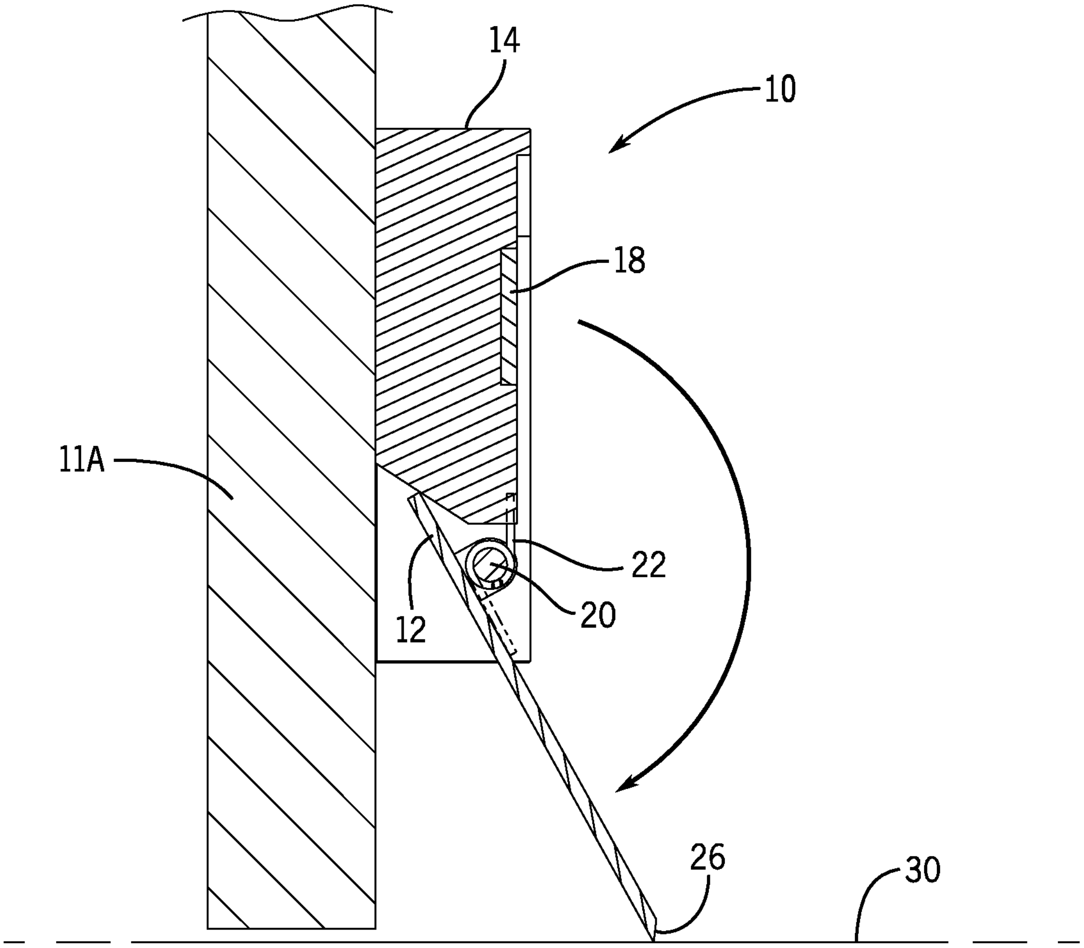
FIG. 6 is a cross-sectional view, similar to FIG. 5, showing the motion and resultant activation of the blade component.

By way of example, and referring to FIGS. 1-6, some embodiments of the present disclosure include a device 10 for slowing or stopping a door 11A from opening or moving, the device 10 comprising a base 14 configured to be attached to the door 11A; and a spring loaded blade 12 hingeably attached to a bottom portion of the base 14, such that the blade 12 is configured to pivot from a first, closed orientation, as shown in FIG. 1, to a deployed configuration, as shown in FIG. 2, wherein the base includes a magnet 18 mounted thereto, and the blade 12 comprise a distal pointed end 26 that is designed to magnetically engage/disengage with the magnet 18 and, thus, the base 14. As shown in FIGS. 5 and 6, when a proximal end of the blade 12 is pressed, kicked, or otherwise pushed inward, the distal end 26 of the blade disengages from the magnet 18 and swings downward to extend at an angle below a lowest surface of the mounted base 14. The pointed distal end 26 may then rest on a floor surface 30 and dig into the floor if the door 12 is pushed toward the base 14, wherein a spring 22 helps to tension the blade 12 and force it downward toward the floor.

More specifically, and as shown in the Figures, the base 14 may comprise a block with a rear face 28, a front face, two side faces, and two angled side faces. The rear face 28 may be the surface of the block designed to be positioned against a surface of the door 11A. The front face may have a blade shaped recess extending therein, wherein the blade shape of the recess closely approximates the shape of blade 12, wherein a top edge of the blade shaped recess is pointed and coincides with the distal pointed end 26 of the blade 12. A magnet 18 may be mounted within the blade shaped recess, such as within a magnet recess in a back wall of the blade shaped recess. As shown best in FIG. 3, the base 14 may have a cut out, such as a substantially rectangular cut out in a bottom portion thereof between the two angled side faces, wherein the cut out is wide enough to accommodate placement of the proximal end of the blade 12 therein. In fact, as shown in the Figures, a pin 20 may extend through the angled side faces and the cut out, and the blade 14 may be rotatably mounted to the pin 20, such that the blade 12 is configured to rotate about the pin 20 with respect to the base 14. More specifically, a back surface of the blade 12 may have a pair of protrusions 24 extending therefrom, wherein each of the protrusions includes a protrusion channel extending therethrough, the protrusion channels being sized to encircle the pin 20. As shown in the Figures, the protrusions 24 may be spaced apart and each positioned at a respective side edge of the back surface of the blade 12, such that there is an open space between the protrusions 24. When the blade 14 is mounted to the pin 20, a spring, such as a torsion spring 22, may be positioned on the pin 20 between the pair of protrusions 24. The torsion spring 22 may function to push the blade 12 outward, such that it rotates down and contacts the floor surface 30. As shown in FIG. 3, a bottom portion of the back wall of the blade shaped recess may include a pair of spring notches, each notch being sized to accommodate placement of a respective end of the torsion spring 22 therein.

As shown in FIGS. 3 and 4, the blade 12 may be rotatably mounted to the pin 20 or, in other words, the protrusions 24 may be positioned, such that the blade 12 is able to rotate within the cut out of the base 14 without breaking through the plane of the rear face 28 of the base 12. As such, the blade 12 is thus capable of rotating from the closed configuration, shown in FIG. 1 to the deployed configuration, shown in FIG. 2.

As shown in the Figures, the base 14 may further comprise pin orifices in the side faces, such as the angled side faces, wherein the pin is configured to be inserted and mounted therein. The base 14 may also include various mounting orifices extending therethrough, wherein fasteners 16 are configured to be inserted into the mounting orifices and engaged with the door 11A to mount the device 10 to the door 11A.

While the Figures show and the above descriptions includes a description of the shape of the base 14, it is not particularly limited to this shape. For example, the angled side faces may not be necessary, but when included they may reduce the likelihood of injury and may improve aesthetics.

The components of the device 10 of the present disclosure may be made from any suitable materials. In some embodiments, the base 14 comprises aluminum, and the blade 12 comprises steel, such as hardened steel. The magnet 18 may comprise, for example, a circular magnet, as shown in the Figures, but the use of other shaped magnets is also envisioned. The magnet 18 may have a magnetic strength strong enough to overcome the force of the tension spring 22 alone, but weak enough that a swift kick, push, or other force on the distal end of the blade 12 will disengage the magnetic connection between the magnet 18 and the blade 12 and allow the To use the device 10 of the present disclosure, the base 14 may be mounted to the backside of a door 11A (i.e., the side opposite the surface pushed by a user to open the door 11A). As such, this device 10 may be most beneficial for doors that open into a room, versus those that open outward and away from the room. The base 14 may be mounted using fasteners, wherein the mounting location may be above the bottom of the door 11A a distance that is sufficient for allowing the blade 12 to rotate downwards to an angle at which the distal pointed end 26 is capable of abutting and digging into the floor surface 30. Thus, as shown in FIG. 6, the deployed configuration of the blade 12 is one in which the blade 12 extends downward from the base at an angle. Initially, and to allow for movement of the door 11A, the blade 12 may be rotated upwards by pulling the distal pointed end 26 upwards until it engages with the magnet 18 on the base 14. If and when the device 10 needs to be deployed, a user may simply kick, push, or otherwise place inward motion on the proximal end of the blade 12, as shown in FIG. 5. This motion may cause the magnet 18 to disengage with the blade 26, as shown in FIG. 6, wherein the torsion spring 22 drives movement of the blade 12 and holds it in the deployed configuration. The more someone pushes on an exterior surface of the door 11A, the more the distal pointed end 26 will dig into the floor surface 30.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

What is claimed is:

1. A device for slowing or stopping a door from opening or moving, the device comprising:
- a base configured to be attached to the door, the base including a magnet mounted thereto, the base comprising:
  - a block with a rear face, a front face, two side faces, and two angled side faces,
  - wherein:
    - the rear face is designed to be positioned against a surface of the door;
    - the front face is opposite the rear face; and
    - the base has a cut out in a bottom portion thereof between the two angled side faces;
    - a pin extends through the angled side faces and the cut out; and
- a spring-loaded blade hingeably attached to a bottom portion of the base, the spring-loaded blade comprising a proximal flat end and a distal pointed end,
- wherein:
  - the cut out has a width sufficient to accommodate placement of the proximal flat end of the blade therein;
  - the blade is rotatably mounted to the pin;
  - the blade is configured to pivot from a first closed orientation to a second deployed configuration;
  - when the blade is in the first closed orientation the blade is engaged with the magnet on the base;
  - when the blade is in the second deployed configuration, the blade is disengaged from the magnet and the distal pointed end is pointing at an angle downward from the base;
  - a back surface of the blade has a pair of protrusions extending therefrom, each protrusion of the pair of protrusions including a protrusion channel extending therethrough, the protrusion channels being sized to encircle the pin; and
  - a torsion spring is positioned on the pin between the pair of protrusions; and
  - the torsion spring is configured to push the blade outwards.

2. The device of claim 1, wherein:
- the front face has a blade shaped recess extending therein, the blade shape of the recess closely approximating the shape of blade;
- a top edge of the blade shaped recess is pointed and coincides with the distal pointed end of the blade.

3. The device of claim 2, wherein the magnet is mounted within the blade shaped recess.

4. The device of claim 1, wherein a strength of the magnet is greater than a strength of the torsion spring.

* * * * *